United States Patent [19]

Sallberg

[11] Patent Number: 5,502,714
[45] Date of Patent: Mar. 26, 1996

[54] METHOD FOR SELECTING A FREE LINK AND AN ARRANGEMENT HEREFOR

[75] Inventor: Krister Sallberg, Lund, Sweden

[73] Assignee: Telefonaktiebolaget L M Ericsson, Stockholm, Sweden

[21] Appl. No.: 236,200

[22] Filed: May 2, 1994

[30] Foreign Application Priority Data

May 3, 1993 [SE] Sweden .................................. 9301513

[51] Int. Cl.⁶ .................................. H04J 3/14; H04J 3/22
[52] U.S. Cl. .................................. 370/17; 370/54; 370/60.1; 370/79
[58] Field of Search .................................. 370/17, 54, 60, 370/60.1, 79, 94.1, 94.2

[56] References Cited

U.S. PATENT DOCUMENTS

| | | | |
|---|---|---|---|
| 4,984,264 | 1/1991 | Katsube | 370/60 X |
| 5,040,171 | 8/1991 | Osaki | 370/17 |
| 5,070,498 | 12/1991 | Kakuma et al. | 370/60 |
| 5,132,966 | 7/1992 | Hayano et al. | 370/79 |
| 5,164,938 | 11/1992 | Jurkevich et al. | 370/60 |
| 5,347,511 | 9/1994 | Gun | 370/54 |

FOREIGN PATENT DOCUMENTS 0447841  9/1991  European Pat. Off. .

OTHER PUBLICATIONS

Krister Sällberg et al., "A Resource Allocation Framework in B–ISDN", Proceedings of the 1990 XIII International Switching Symposium, Proceedings vol. 1, pp. 111–118.

S. B. Jacobsen et al., "Load Control in ATM Networks", Proceedings of the 1990 XIII International Switching Symposium, Proceedings vol. V, pp. 131–138.

*Primary Examiner*—Douglas W. Olms
*Assistant Examiner*—Russell W. Blum
*Attorney, Agent, or Firm*—Burns, Doane, Swecker & Mathis

[57] ABSTRACT

A method and an arrangement for link allocation which provide selecting a free link for a requested connection from a plurality of available route coordinated links according to a particular resource requirement of the requested connection and depending on the current resource seizure of connections that have already been established on utilized links. The establishment of a requested connection and the connections already established have the same or different resource requirement. The current resource seizure for each link resulting from the established connection or connections is stored in a memory. Each link is sorted in the memory in a link allocated memory site which corresponds to the current resource seizure of the link concerned, or the free resource capacity of the link. When a requested connection with a specific resource requirement occurs, it is first evaluated whether or not a link sorted in a selected memory site has residual free capacity for the requirement in question, the memory site being dependent on the specific resource requirement of the connection. When such is the case, establishment of the requested connection is accepted, either via the link or via another suitable link.

14 Claims, 5 Drawing Sheets

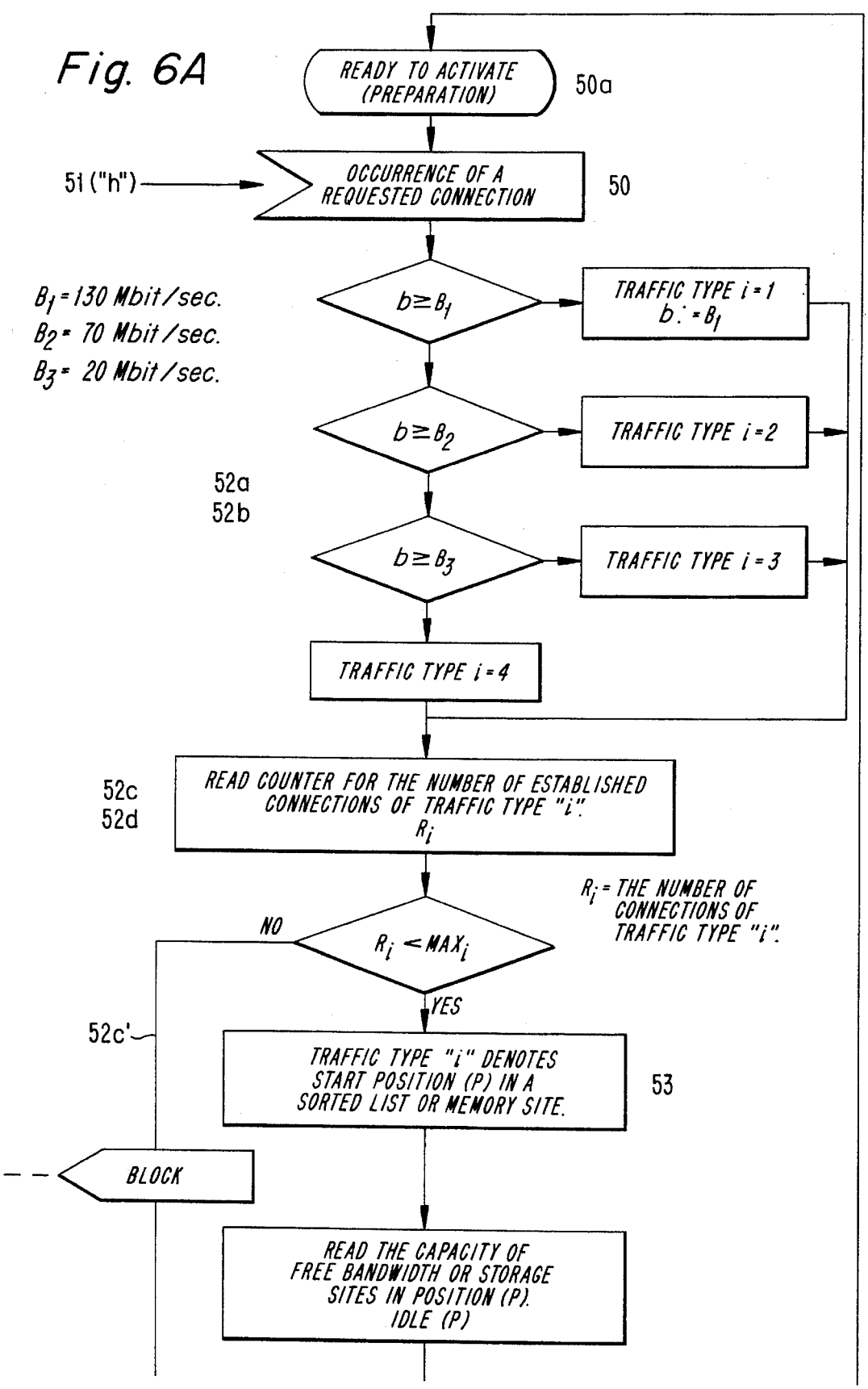

METHOD FOR SELECTING A FREE LINK AND AN ARRANGEMENT HEREFOR

TECHNICAL FIELD

The present invention relates primarily to a method for selecting a free link from among a number of available links coordinated to form a route, for a connection which requests for a connection, through the route, to utilize a route link which is fully or partially free, where the choice of a free link for the requested connection is governed by the particular resource requirement of said requested connection and where the resource requirement of currently established connections on occupied links shall be taken into account.

The resource requirement of a requested connection may be the same as or different to the resource requirement of connections that have already been established.

The invention also relates to an arrangement for selecting a free link for a requested connection in accordance with the invention.

The reference to setting-up a requested connection in the following description shall be understood to mean that an exchange of signals or a transmission of signals is desired by utilizing the full resource capacity or full resource utilization of a link, or the full or partial free resource capacity available on a partially seized link through the route.

By "established connection" shall be understood that a signal exchange or a signal transmission having a given resource requirement has already been established over a link within the route.

The terms "resource requirement" and "resource capacity" have been used in the introduction to illustrate different requirements and residual capacity, such as bandwidth requirement, although the expression also includes other requirements, such as the requirement of a number of buffer sites in a memory.

BACKGROUND ART

Various methods and systems are known to the art by means of which a requested connection can select a suitable link from among a number of available links coordinated to form a route in accordance with a particular resource requirement, such as bandwidth, the number of buffer sites required by the requested connection, and like requirements, and in accordance with the extent to which resources have been used at that particular time within the links as a result of the seizure of connections that have already been established.

A comprehensive report of the present standpoint of techniques is found in the publication "Proceeding of the 1989, Singapore International Conference on Communications, paper B5.1, 1989", where "Some Aspects of Link Allocation in an IBCN" by Johan M. Karlsson is described more specifically under section B, "Integrated Broadband Communication Networks (IBCN)".

This publication discusses different aspects of selecting free links within a route in accordance with the bandwidth requirement of a requested connection, so-called link allocation, in an integrated bandwidth communications system, and a number of basic methods, so-called allocation algorithms, are indicated for structuring and allocating requested connections in accordance with their bandwidth requirement, with the intention of preventing excessively high congestion possibilities.

Various signalling systems in which the present invention can be applied are also known to the art.

Within the ATM system (Asynchronous Transfer Mode), the resources required by a connection may be a selected bandwidth and/or a selected number of buffer sites.

Within the Multislot-STM system (Synchronous Transfer Mode), the resources required by a connection are selected bandwidth requirements.

With regard to one proposed application of the present invention, it is known to use for desired signal transmission different transfer modes which provide connections where each connection can seize different resource quantities, such as bandwidth and/or buffer sites, and in a socalled ATM network desired signal transmission is effected with the aid of data cells and with an address indicating part, a so-called "Header" and an information transmitting part, "Payload".

SUMMARY OF THE INVENTION

Technical Problems

When studying the prior art as described above, it will be seen that a technical problem resides in providing a method and an arrangement Which enables the congestion probability of requested connections having different resource requirements, such as bandwidth requirement, the number of buffer sites required and like requirements, to be generally smoothed-out in a more controlled fashion, and therewith be able to utilize the available resources to a great extent while observing current requirements of congestion probabilities.

In the light of the very wide spectrum of resource requirements of requested connections, where not only the resource requirements of the connections and the extent to which resources are utilized within each link are different but also the seizure times, it will be seen that a technical problem resides in providing a link allocation algorithm which is both robust and flexible. By "robust" is meant that the algorithm need not be finely adjusted, but will provide good characteristics despite variations in the characteristics of the traffic or connections, while by the expression "flexible" is meant that the algorithm can be adjusted with the aid of just a few parameters.

It will also be seen that a technical problem is one of realizing the significance of adjusting the algorithm towards characteristics which correspond to a prevailing distribution of connections that have different resource requirements. This applies in particular when the traffic is differently distributed in different routes and can change in time.

When considering the earlier standpoint of techniques as described above, where the current utilization of resources on a connection or connections established on each link is stored in a memory, it will be seen that a technical problem resides in realizing the significance of sorting each link in the memory with a link allocation position which corresponds to the current resource utilization of the link concerned at that time, or the free resource capacity of said link.

It will also be seen that a technical problem resides in realizing the advantages that are afforded in the case of a requested connection requiring a specific resource facility in evaluating primarily how much free capacity for the resource required is found in a selected memory site and a link sorted in this position, where said memory site is dependent on the specific resource requirement of the requested connection and, when such is the case, to realize that the requested connection can be set-up through a link in the route.

It will be seen that another technical problem is one of realizing the advantages that are afforded by limiting the number of connections having predetermined resource requirements when the number of links is limited.

Such limitation will create possibilities of achieving more uniform distribution of the congestion probability of all requested connections having mutually different resource requirements.

It will also be seen that a technical problem resides in realizing the significance of not immediately accepting an initially indicated and free link capacity and seizing this link to set-up the requested connection, but instead immediately initiating a search procedure (such as an interval binary process or binary chop) to establish whether or not another link whose resources are more utilized and which is sorted in a memory position or memory site further down in the memory has free resources which correspond to or slightly exceed the resource requirement of the established requested connection, and if so to select this link.

It will also be seen-that when applying the aforesaid search method, a technical problem resides in providing conditions which will enable the link that has free resources corresponding to or slightly exceeding the resource requirement of the established requested connection to be evaluated via said search method, and providing a high, preferably the highest degree of resource utilization by virtue of the resource addition thereby afforded.

SOLUTION

With the intention of solving one or more of the aforesaid technical problems, the present invention relates to a method and to an arrangement which will enable a free link to be selected from a number of route-coordinated available links to set-up a requested connection in accordance with the resource requirement or requirements of said connection and in dependence on the resource utilization of connections that have already been established on utilized links, and wherein a requested connection and established connections have the same or different resource requirements, and wherein information relating to the current total utilization of resources or the free or unused resource capacity of each link is stored in a memory site or memory position.

According to the present invention, each link is sorted in said memory in a link allocated memory site corresponding to the total resource utilization of the link at that time or corresponding to the free or unused resource capacity of the link, wherein when a request for a connection is made with a specific resource requirement, it is firstly established whether or not a link sorted in a specific memory site has free capacity for this specific resource requirement, said memory site being contingent on the specific resource requirement of the connection, and if such is the case, the establishment of the requested connection is generally accepted.

In accordance with further developments of the invention lying within the scope of the inventive concept, a search procedure is carried out to establish a link which has a free resource capacity corresponding to or only slightly exceeding the resource requirement of the requested connection.

According to another alternative embodiment, there is evaluated by means of a search process that link which has a free resource capacity corresponding to or slightly exceeding the resource requirement of the requested connection and which as a result of the addition offered by the resource requirement provides a high, or the highest, degree of utilization.

Depending on the signal transmission system chosen, the resource requirement comprises a bandwidth requirement and/or the requirement of a number of buffer sites.

According to the present invention, the number of connections requiring a given resource or resources is maximized in order to limit the number of route-forming links in relation to the desired information transmission capacity while still providing conditions for well-adapted distribution of congestion probability between connections which require different resources.

ADVANTAGES

Those advantages primarily associated with an inventive method and an inventive arrangement for selecting a link suitable for a requested connection, particularly with regard to a link allocating algorithm in an ATM network, reside in the provision of conditions whereby the probability of congestion with connections having different resource requirements are generally equalized, thereby achieving high resource equalization within selected links.

BRIEF DESCRIPTION OF THE DRAWINGS

An exemplifying embodiment of an arrangement for selecting a free link from among a plurality of route-coordinated available links to establish a requested connection in accordance with the present invention will now be described with reference to the accompanying drawings, in which

FIGS. 6A and 6B depict a simplified flowsheet illustrating functions associated with the invention for ascertaining whether or not the route consisting of a number of links is able to support the requested connection.

DESCRIPTION OF EMBODIMENTS AT PRESENT PREFERRED

Figure 1:
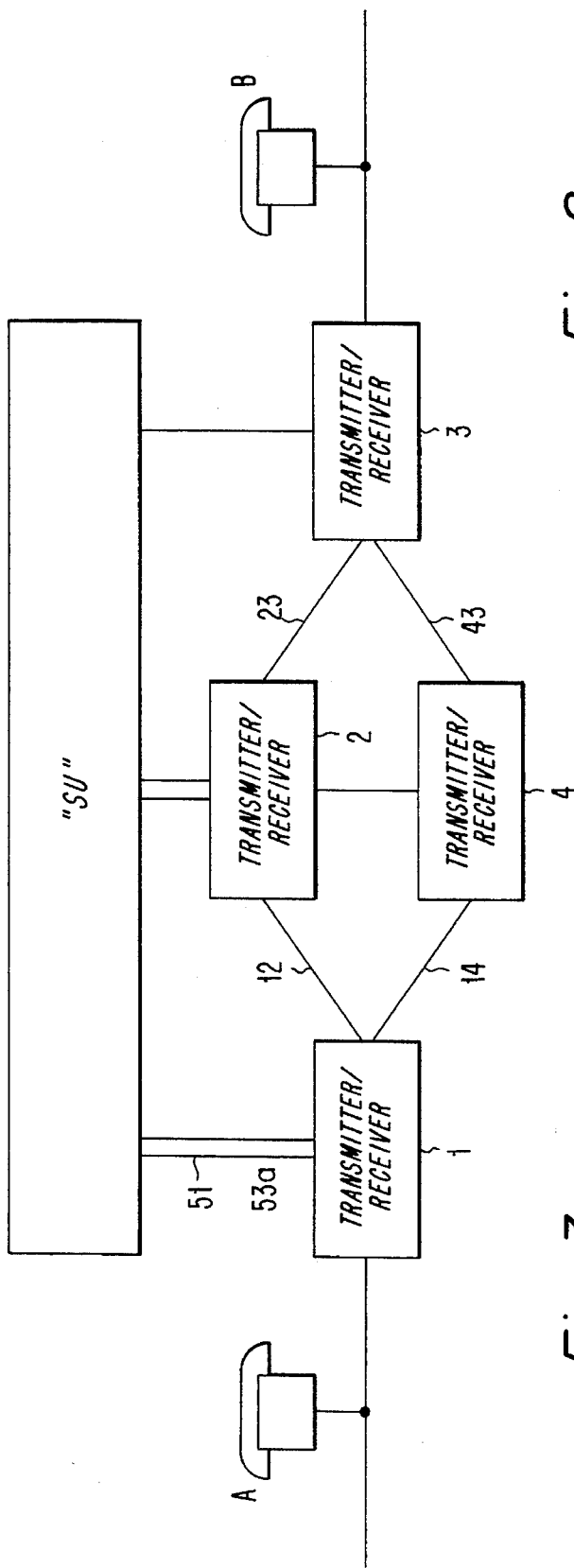
FIG. 1 illustrates in principle a telecommunications network comprising a number of stations between which there extends one or more routes, each including a plurality of links.

FIG. 1 is a greatly simplified illustration of a network adapted for telecommunication and/or data communication comprising four transmitters and receivers 1, 2, 3 and 4 and a route 12 connected between the units 1 and 2, a route 23 connected between the units 2 and 3, a route 14 connected between the units 1 and 4, and a route 43 connected between the units 4 and 3.

Since the signal structuring can be considered to be the same irrespective of the route considered, the following description will be given solely with reference to the route 12.

A telecommunications network according to FIG. 1 will function as follows in principle, with association with the fundamental concept of the invention.

When a calling telephone set "A" desires to establish telecommunication with a called telephone set "B" the telephone set "A" sends a message to the unit 1 and the message can be assumed to be transferred to control equipment "SU".

It is necessary for the message to contain information which is significant and useful to the present invention, namely information relating to the requisite bandwidth (or the number of buffer sites required in a memory) for transmission of the signal, and also information relating to the address of the telephone set "B".

When the control equipment "SU" obtains information to the effect that the A-set wishes to be connected to the B-set with a specific resource requirement or bandwidth requirement, illustrated as 30 Mbit/sec., known means are activated for selecting a route through the network between "A"-set the "B"-set (Routing).

The invention is based on the ability to select a link that has sufficient free resource capacity and after seizure the least possible residual capacity for each route, while maintaining a well-adapted and uniformly distributed congestion probability for connections with different resource or bandwidth requirements.

The control equipment "SU" now searches for the free links that can be utilized for the requisite signal transmission within the routes 12, 14, 23 and 43 and seizes selected links for precisely this connection.

Figure 2:
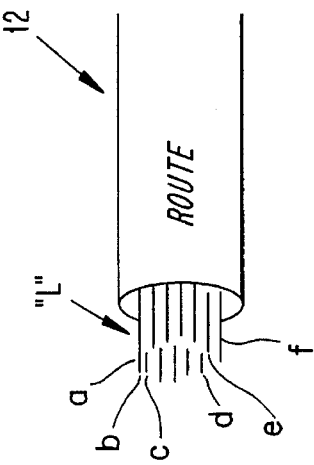
FIG. 2 is a simplified view of one of these routes comprising a plurality of links.

FIG. 2 illustrates a route 12 which includes a predetermined number of links "L" referenced a, b . . . f. It will be understood that the route may contain many more links "L" than those shown, and that the number of links illustrated have been limited for reasons of illustration.

Each link is adapted for the transmission of one connection or a number of simultaneous connections with similar or different resource requirements, up to a maximized resource requirement for the link concerned, illustrated in the following as 155 Mbits/sec.

The maximum resource seizure on respective links will vary in dependence on the chosen transfer mode.

For instance, the maximum bandwidth seizure from established connections in a STM-Multislot network may be 100% of the total bandwidth capacity of the link.

The following description is intended to exemplify application of the invention in an ATM network.

In practice, this will mean that when a link is used for solely one connection, the whole bandwidth capacity (100%) of the link can be seized.

On the other hand, when a link is used for two or more connections, it is not possible to seize the full bandwidth capacity of the link, but that in such cases only a percentage, say 85%, can be considered as the full bandwidth capacity of the link each time estimations are made as to whether the link shall be seized for a further connection or not.

This will be described and illustrated in more detail in the following, with reference to FIGS. 4A and 4B.

Figure 3:
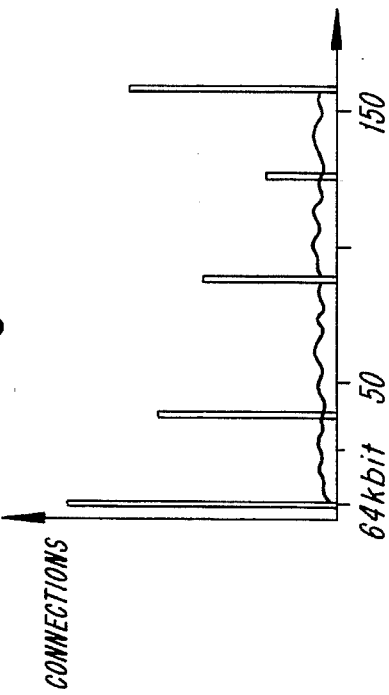
FIG. 3 illustrates an example of the possible distribution of and the number of requested connections having different bandwidth requirements within a link having a total bandwidth utilization of 155 Megabits per second.

FIG. 3 illustrates an example of the possible distribution of the number of requested connections having different bandwidth requirements within a route, where each link is assumed to be adapted and dimensioned for transporting a maximum of 155 Mbits/sec. in the case of one single connection, and 0.85×155 Mbits/sec. (130 Mbits/sec.) in the case of two or more connections.

FIG. 3 is intended to show that a large number of connections require solely 64 Kbits/sec., these connections comprising telephone connections, telefacsimile connections and the like.

In addition to a large number of connections requiring higher bandwidths, there is also found a relatively large number of connections which each require and seize the entire bandwidth of the link, these connections transmitting TV signals, video signals and the like.

When transmitting an occurrent requested connection, it is therefore necessary to establish, among other things, the broadband requirement of the connection and therewith allocate the connection a "Traffic type" from among a number of available traffic types. This will be described in more detail further on.

Figure 4A:
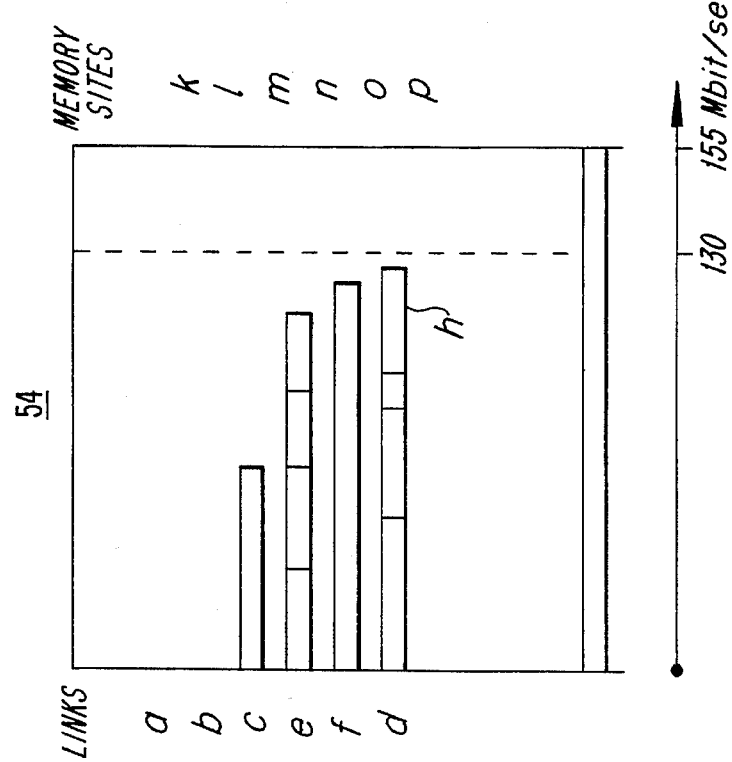
FIGS. 4A and 4B illustrate schematically the different seizures of a number of links sorted in a memory significant to the present invention, wherein a memory site allocated to a respective link corresponds to the bandwidth utilization of the link at that moment in time, wherein totally free links are sorted uppermost and those links which are utilized to progressively greater extent are sorted therebeneath, FIG. 4A showing one state and FIG. 4B showing a changed state.
Figure 4B:
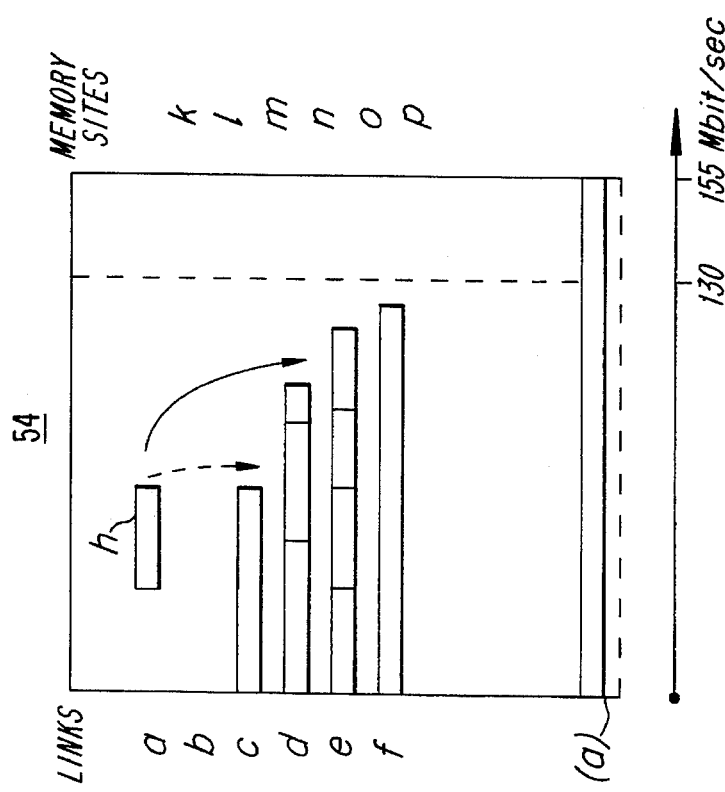

FIGS. 4A and 4B are intended to illustrate the instantaneous content of a memory 54 significant to the invention, the function of the memory being described in more detail with reference to FIGS. 5, 6A, 6B and 7.

The content of the memory 54 shall represent the instantaneous bandwidth utilization of each link in a route, or alternatively the free bandwidth capacity offered by each link.

FIGS. 4A and 4B are intended to illustrate in particular that the memory 54 is allocated different fixed memory sites or memory positions, referenced "k" to "p" with the position "k" uppermost and the position "p" five positions therebelow.

A large number of fixed positions in the memory 54 are thus not shown, since these positions are not significant to the following exemplifying description.

FIG. 4A illustrates that the extent to which a bandwidth has been utilized, bandwidth utilization, or the current bandwidth seizure for a number of links, alternatively the free bandwidth capacity, up to 130 Mbits/sec., has been inserted in each fixed memory site "k" to "p".

It follows from this that for each such link it is possible to establish the free bandwidth capacity of the link as free capacity up to 130 Mbits/sec.

For the sake of simplicity, the links "a" to "f" have been sorted in FIGS. 4A and 4B in accordance with like or successively increasing bandwidth utilization in sequence, and correspond to the memory sites "k" to "p".

More specifically, it is shown that the link "a" sorted into memory site "k" is empty that the link "b" in memory site "l" is also empty, the link "c" in memory site "m" seizes about 80 Mbits/sec., the link "d" in memory site "n" seizes about 100 Mbits/sec., the link "e" in memory site "o" seizes about 115 Mbits/sec., and so on.

Although the bandwidth seizure for each link can be comprised of solely one connection (c), the following description starts from the assumption that the bandwidth requirements of several connections have been summated to form an assumed seizure distribution (d).

FIG. 4A also illustrates an unsorted bandwidth requirement (30 Mbits/sec.) for a requested connection "h" from A to B.

When this requested connection "h" is to be sorted in links that have already been seized, it can be established that each of the links "a" "b" "c" and "d" has a sufficiently free bandwidth, but that since the link "d" has already been utilized to a great extent that this link should be selected first.

The choice of link allocated to the requested connection "h" constitutes the fundamental aspect of the invention and will therefore be described in more detail.

When the requested connection with the bandwidth requirement of 30 Mbits/sec. has been classified, i.e. has been allocated a Traffic type, it shall be established in a fixed memory site "m" whether or not the link "c" stored in said memory site has sufficient residual capacity to manage this connection "h".

If the answer is "yes", a search procedure is undertaken to establish whether or not there is stored in underlying fixed memory sites information relating to other links that have sufficient remaining bandwidth capacity to manage this connection.

This search procedure shows that the link "d" in memory site "n" can be used.

Subsequent to having given the link "d" the bandwidth requirement "h", its momentary bandwidth seizure increases and the link "d" is moved from the memory site "n" in FIG. 4A to the memory site "p" in FIG. 4B, the links "e" and "f" having been moved up one step.

Should the requested connection require a bandwidth of 130 Mbits/sec. or more, the connection is allocated another classification, Traffic type, and the question of whether the memory site "k" has a free link "a" is raised.

If the answer is "yes", as in the illustrated case, the link "a" is seized and the link is moved much further down, if not to the lowermost position of the memory sites and remaining links are moved up one step.

The invention is based on the concept of evaluating the free capacity of a link sorted in a memory site ("m" or "a") corresponding to one traffic type in the case of a specific type of traffic.

As will be understood, when the connection "h" is released, the link "d" is moved up to the position shown in FIG. 4A, with a corresponding change in the positions "e" and "f".

There will now be described in more detail with reference to FIGS. 5 6A, and 6B a connection setup in which a requested connection "h" of one traffic type having a bandwidth requirement of 30 Mbits/sec. shall seize a link with the criterion that each route will only accept a predetermined number of connections of one and the same traffic type.

Figure 5:
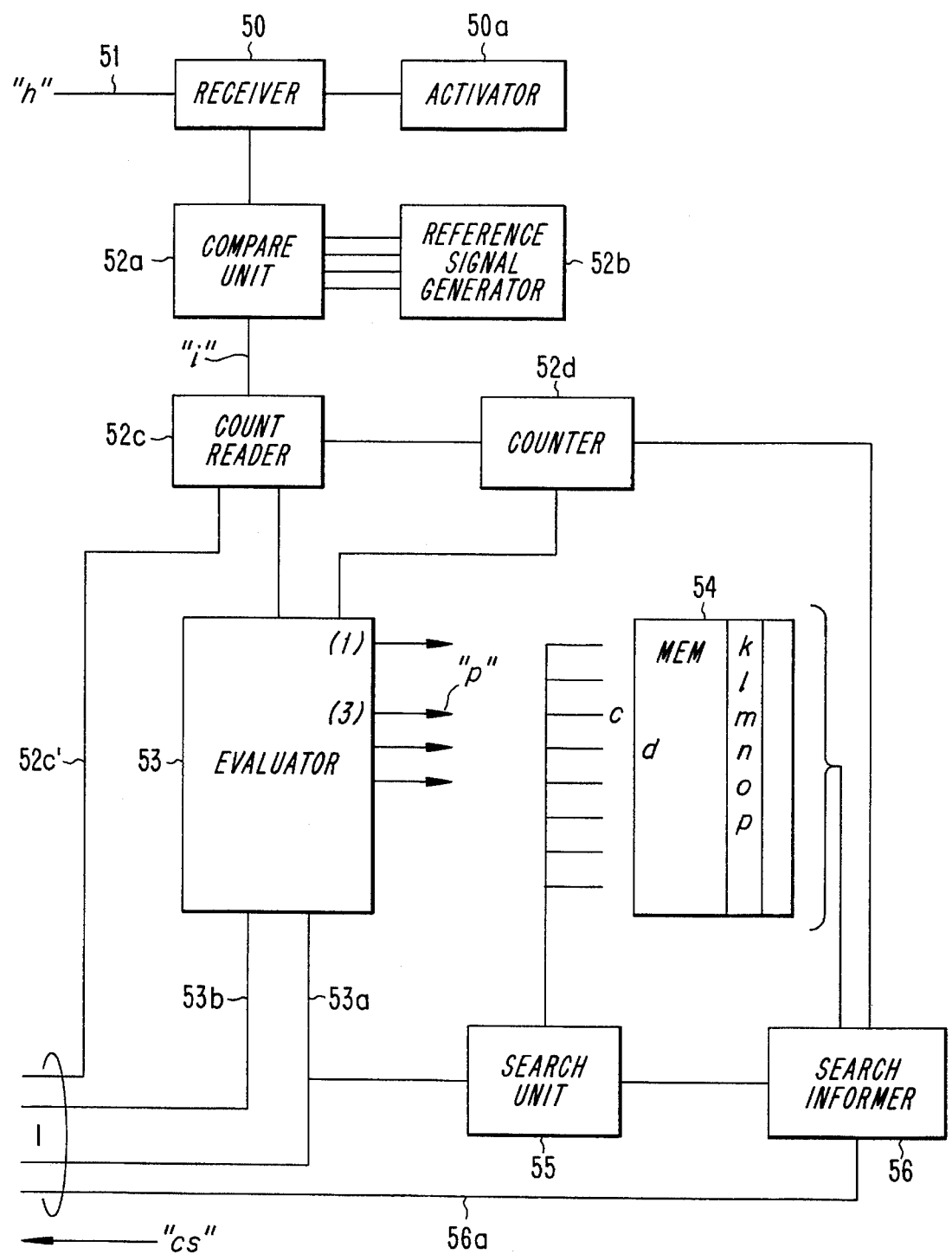
FIG. 5 is a block schematic of a principle circuit diagram of an arrangement having characteristics significant of the present invention.

FIG. 5 is a block schematic illustrating an arrangement which enables a free link "d" to be selected for a particular bandwidth requirement from among a plurality of available links coordinated to form the route 12, for a requested connection "h" occurring on the line 51.

When setting up the connection, there is initiated the selection of a suitable connection route, by virtue of the control equipment "SU" asking which connection routes are available for a connection having a given bandwidth requirement (30 Mbits/sec.) and which shall connect the telephone set "A" with the telephone set "B".

A device 50, which includes a memory function, receives signals, among other things representative of the bandwidth requirement 30 Mbits/sec., and can be activated by a signal from an activating means 50a.

The particular bandwidth requirement is now classified in a comparison circuit 52a.

A number of reference signals are generated in a device 52b for allocating connections having a bandwidth equal to or exceeding 130 Mbits/sec. a first traffic type, connections having a bandwidth equal to or exceeding 70 Mbits/sec. a second traffic type, connections having a bandwidth equal to or exceeding 20 Mbits/sec. a third traffic type, and so on.

A requested bandwidth requirement is compared in the comparison circuit 52a with a number of programmed fixed bandwidth values which when agreement is found allocates a traffic type to the requested connection from among several available traffic types "i".

The arrangement includes a unit 52c which reads a counter 52d which discloses the number of connections of a selected traffic type that have already been established on the route concerned.

A route 12 and/or a link can be blocked against the establishment of a connection of a specific traffic type when connections with this traffic type already utilize the links up to or at an extent equal to a given upper limit.

Should the check show, through the counter 52d, that the route 12 is already seized by a maximum number of connections of this traffic type, a blocking or lockout function is activated which informs the central control equipment "SU" through a line 52c'.

If it is assumed that no such block or lockout exists, there is activated a device or unit 53 which functions to detect the traffic level of the link, i.e. the extent to which it has been seized, that is sorted in a specific memory site (or free available capacity) in the memory in accordance with traffic type.

In the case of the first traffic type (130 Mbits/sec.), the uppermost position "k" is sensed and possibly the seizure of the link "a" sorted in this memory site.

An underlying position is sensed for the second traffic type (70 Mbits/sec. ).

The position "m" is sensed for the third traffic type (20 Mbits/sec.) and it is established whether or not the link "c" has sufficient capacity to transmit the connection "h".

The memory 54 is intended to sort records or items in accordance with the requirement.

The invention is thus based on the concept of establishing through the unit 53 for each selected traffic type seized in the start position whether or not a memory site "m" determined by the traffic type (3) includes a link having a bandwidth seizure which enables an addition to a connection determined by the traffic type (3) with associated bandwidth without the sum of the earlier bandwidth seizure and the additional seizure exceeding a determined value, or whether or not the additional seizure can be accepted.

If the additional seizure cannot be accepted for the link stored in a selected memory site, a lockout signal is generated on line 53b.

If the additional seizure can be accepted, an acceptance signal is generated on line 53a, which indicates that the connection can be set up.

According to the concept of the invention, the central control equipment "SU" can obtain an immediate indication to the effect that the route 12 can receive a connection which requires 30 Mbits/sec., although the precise channel number and link have not yet been established.

If the signal 53a is accepted, there is initiated a search procedure which is based on the interval binary search method, through the medium of search equipment 55.

The underlying memory sites in the memory 54 are now sensed with the aid of the search equipment 55, together with relevant bandwidth seizure of the links stored in said memory, so as to be able to evaluate which memory site has a link with sufficient capacity to manage the particular bandwidth requirement, and in the illustrated case the memory site "n" and the link "d" can be considered to have sufficient capacity.

The search equipment 55 informs through a unit 56 that the memory site "n" and the link "d" have now been seized by the connection "h" and that a channel number corresponding to the link shall be transmitted to the control equipment "SU" over the line 56a.

When the link "d" has been supplemented with a bandwidth seizure of a further 30 Mbits/sec., the link is lowered in the memory sites in the aforedescribed manner.

Even though the bandwidth seizure has been illustrated in the manner shown in FIGS. 4A and 4B, it lies within the scope of the invention to store in each memory site solely one or more digits representative of the utilized bandwidth and/or buffer requirement.

Figure 6B:
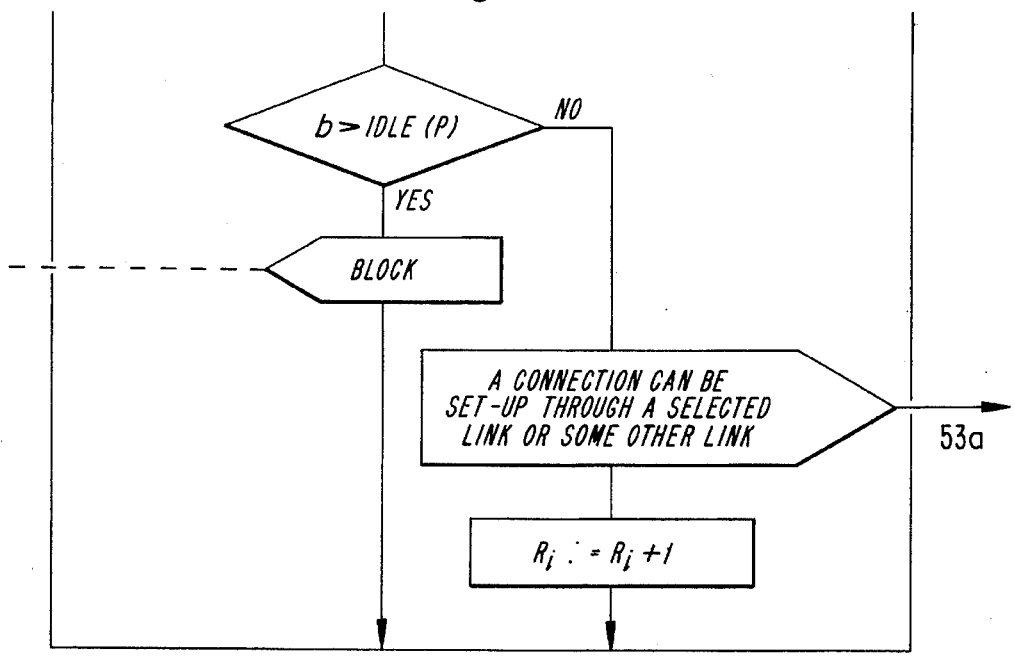
Figure 7:
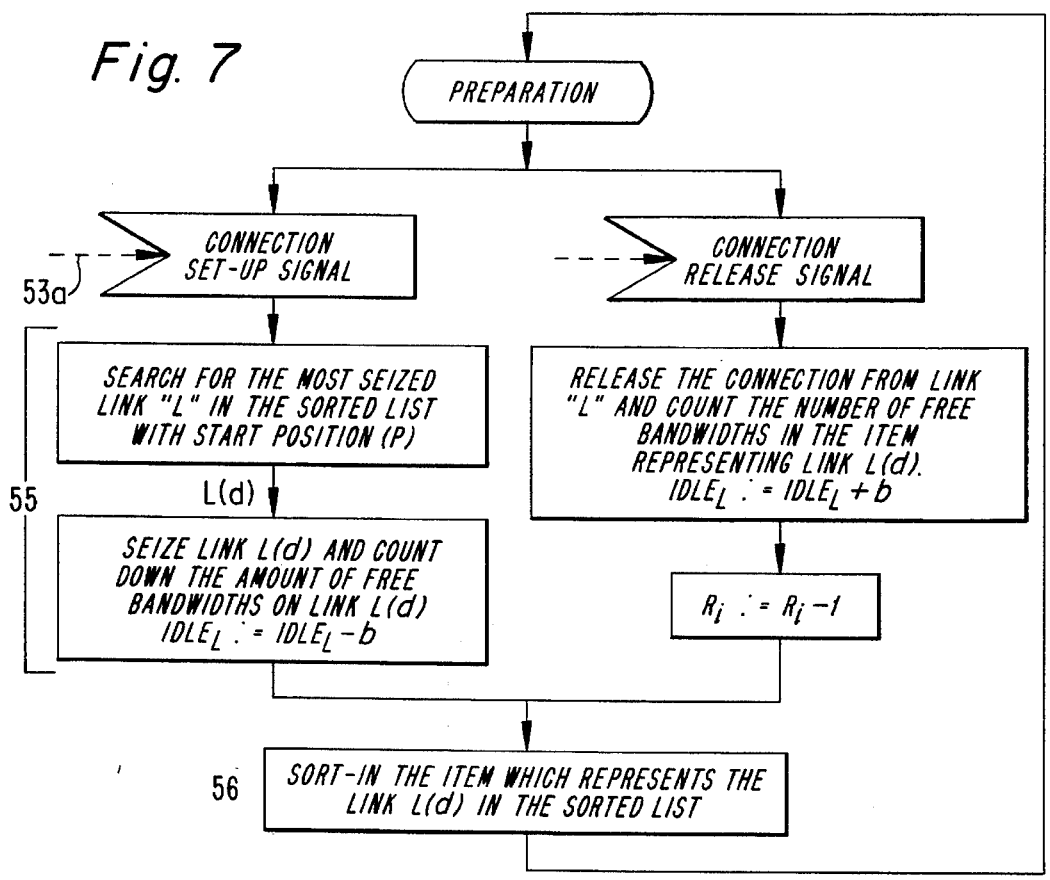
FIG. 7 is a simplified flowsheet illustrating functions associated with the invention for finding a link which is suitable for the requested connection and for clearing the connection as a result of releasing the same.

FIGS. 6A and 6B depict a simplified flowsheet disclosing functions associated with the invention for establishing whether or not the route consisting of a number of links is able to carry or transfer the requested connection, and FIG. 7 is a simplified flowsheet disclosing functions associated with the invention for searching for a suitable link for the requested connection and for releasing a disconnected connection.

FIGS. 6A, 6B and 7 refer directly to the described exemplifying embodiment.

It will be understood that the invention is not restricted to the aforedescribed and illustrated exemplifying embodiment thereof and that modifications can be made within the scope of the inventive concept as defined in the following claims.

I claim:

1. A method for selecting a free link for a requested connection from among a plurality of available links coordinated to form a route in accordance with the particular resource requirement of the requested connection and in dependence on the current resource seizure of connections that have already been established on utilized links, wherein the requested connection and the connections that have already been established have the same or different resource requirements, and wherein the current resource seizure of each link resulting from said established connections is stored in a memory, the method including the steps of:

a) sorting each link in the memory in one of a plurality of link allocated memory sites which correspond to the current resource seizure of the link or the free or unused resource capacity of the link, wherein said memory sites are ordered in said memory in accordance with a link capacity associated with each memory site;

b) upon occurrence of said requested connection having said particular resource requirement, choosing a memory site depending on the particular resource requirement;

c) evaluating whether the chosen memory site and a link associated therewith has free capacity for the particular resource requirement; and d) when at least one of the sorted links in the chosen memory site has free capacity for the particular resource requirement, accepting the establishment of the requested connection via the link among the sorted links in the route that after seizure would have the least amount of residual resource capacity.

2. A method according to claim 1, including evaluating whether or not a link has free or unused resource which corresponds to, only slightly exceeds or exceeds the resource requirement of the requested connection with the aid of a search procedure.

3. A method according to claim 1, including effecting a search procedure so as to evaluate whether or not a link has free or unused resource which corresponds to, which only slightly exceeds or which exceeds the resource requirement of the requested connection and as a result of the resource addition offered by the resource requirement provides the most seizure, with the aid of a search procedure.

4. A method according to claim 1, wherein the establishment of the connection is blocked when the link sorted in the chosen memory site does not have free capacity for the particular requirement.

5. A method according to claim 1, wherein the resource requirement is a bandwidth requirement and/or the requirement of a number of buffer sites in a memory.

6. A method according to claim 1, including evaluating the number of connections of a specific traffic type or having a specific resource requirement with the aid of a counter, and accepting the number if it is smaller than or equal to a predetermined number for all links in the route.

7. An arrangement for selecting a free link for a requested connection from among a plurality of available route coordinated links in accordance with a particular resource requirement of the requested connection and in dependence on the current resource seizure of connections that have already been established on utilized links, wherein the requested connection and the established connections have the same or different resource requirements, and wherein the arrangement includes a memory in which the current resource seizure of each link resulting from the established connections is stored, comprising:

a) means for sorting each link in said memory in one of a plurality of link allocated memory sites corresponding to the current resource seizure of the link, or the free resource capacity of said link, where said memory sites are ordered in said memory in accordance with a link capacity associated with each memory site;

b) means for selecting upon the occurrence of said requested connection with said particular resource requirement a memory site depending on the particular resource requirement;

c) means for evaluating whether the selected memory site and a link related thereto has a free or sufficient unused capacity for said resource requirement; and d) means for activating means for accepting and setting-up the requested connection when at least one of the sorted links in the selected memory site has a free or sufficient unused capacity for said particular resource requirement via the link that after seizure would have the least amount of residual resource capacity.

8. An arrangement according to claim 7, further comprising search means connected to the memory functioning to evaluate whether or not a link has a free resource corresponding to or exceeding the resource requirement of the requested connection.

9. An arrangement according to claim 7, further comprising search means operable to evaluate whether or not a link has a free resource capacity corresponding to or slightly exceeding the resource requirement of the requested connection and will provide the most seizure as a result of the resource addition offered by the resource requirement.

10. An arrangement according to claim 7, wherein when the link sorted in the selected memory site does not have a free or sufficient unused capacity for said resource requirement, said means is operable to block the establishment of the requested connection.

11. An arrangement according to claim 7, wherein the resource requirement is a bandwidth requirement and/or the requirement of a number of memory buffer sites.

12. An arrangement according to claim 7, further comprising a counter connected to said means for evaluating which functions to evaluate the number of connections that are established for a specific traffic type or resource requirement, wherein the number is accepted if it is smaller than or equal to a predetermined number for all links in the route.

13. A method according to claim 2, including effecting a search procedure so as to evaluate whether or not a link has free or unused resource which corresponds to, which only slightly exceeds or which exceeds the resource requirement of the requested connection and as a result of the resource addition offered by the resource requirement provides the most seizure, with the aid of a search procedure.

14. An arrangement according to claim 8, wherein said search means is operable to evaluate whether or not a link has a free resource capacity corresponding to or slightly exceeding the resource requirement of the requested connection and will provide the most seizure as a result of the resource addition produced by the resource requirement.

* * * * *